(12) United States Patent
Murozuka

(10) Patent No.: US 11,696,052 B2
(45) Date of Patent: Jul. 4, 2023

(54) SIGNAL PROCESSING DEVICE AND METHOD, AND PROGRAM

(71) Applicant: SONY SEMICONDUCTOR SOLUTIONS CORPORATION, Kanagawa (JP)

(72) Inventor: Masaki Murozuka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/947,732

(22) Filed: Sep. 19, 2022

(65) Prior Publication Data

US 2023/0020003 A1 Jan. 19, 2023

Related U.S. Application Data

(63) Continuation of application No. 16/620,114, filed as application No. PCT/JP2018/021142 on Jun. 1, 2018, now Pat. No. 11,477,407.

(30) Foreign Application Priority Data

Jun. 16, 2017 (JP) ................................ 2017-118493

(51) Int. Cl.
*H04N 25/75* (2023.01)
*H04N 3/14* (2006.01)
(Continued)

(52) U.S. Cl.
CPC .......... *H04N 25/75* (2023.01); *H04N 3/1506* (2013.01); *H04N 5/04* (2013.01); *H04N 9/3191* (2013.01);
(Continued)

(58) Field of Classification Search
CPC ...... H04N 3/1506; H04N 5/04; H04N 9/3191; H04N 17/002; H04N 17/004; H04N 23/12;
(Continued)

(56) References Cited

U.S. PATENT DOCUMENTS

2003/0138055 A1 7/2003 Saito et al.
2003/0138056 A1* 7/2003 Uesugi ................. H04L 1/1893
375/262
(Continued)

FOREIGN PATENT DOCUMENTS

CN 1461550 A 12/2003
CN 101119490 A 2/2008
(Continued)

OTHER PUBLICATIONS

Office Action for CN Patent Application No. 201880038331.0, dated Apr. 13, 2021, 5 pages of Office Action and 8 pages of English Translation.

(Continued)

*Primary Examiner* — Nelson D. Hernández Hernández
(74) *Attorney, Agent, or Firm* — Chip Law Group

(57) ABSTRACT

The present technology relates to a signal processing device and method, and a program that enable easier and more accurate failure detection. The signal processing device includes: an addition unit that adds test data for failure detection to valid data on which predetermined processing is to be performed, two or more samples processed in parallel in different paths having a same sample value in the test (Continued)

data; and a signal processing unit that performs the predetermined processing on the valid data and the test data that has been added to the valid data by a plurality of the paths. The present technology can be applied to in-car cameras.

20 Claims, 12 Drawing Sheets

(51) Int. Cl.
*H04N 5/04* (2006.01)
*H04N 9/31* (2006.01)
*H04N 9/71* (2006.01)
*H04N 17/00* (2006.01)
*H04N 23/12* (2023.01)
*H04N 25/70* (2023.01)
*H04N 25/74* (2023.01)
*H04N 25/76* (2023.01)

(52) U.S. Cl.
CPC .............. *H04N 9/71* (2013.01); *H04N 17/002* (2013.01); *H04N 17/004* (2013.01); *H04N 23/12* (2023.01); *H04N 25/70* (2023.01); *H04N 25/74* (2023.01); *H04N 25/76* (2023.01)

(58) Field of Classification Search
CPC ........ H04N 25/70; H04N 25/74; H04N 25/75; H04N 25/76
See application file for complete search history.

(56) References Cited

U.S. PATENT DOCUMENTS

| | | |
|---|---|---|
| 2010/0077276 A1 | 3/2010 | Okamura et al. |
| 2010/0182301 A1 | 7/2010 | Yasuda |
| 2013/0293724 A1* | 11/2013 | Martinussen .......... H04N 25/68 348/175 |

FOREIGN PATENT DOCUMENTS

| | | |
|---|---|---|
| EP | 1301002 A1 | 4/2003 |
| JP | 11-055551 A | 2/1999 |
| JP | 2003-046586 A | 2/2003 |
| JP | 2010-171490 A | 8/2010 |
| JP | 2016-008970 A | 1/2016 |
| JP | 2017-092757 A | 5/2017 |
| WO | 2002/069593 A1 | 9/2002 |

OTHER PUBLICATIONS

International Search Report and Written Opinion of PCT Application No. PCT/JP2018/021142, dated Jul. 31, 2018, 08 pages of English Translation and 08 pages of ISRWO.
Non-Final Office Action for U.S. Appl. No. 16/620,114, dated Feb. 16, 2022, 13 pages.
Notice of Allowance for U.S. Appl. No. 16/620,114, dated Jun. 14, 2022, 8 pages.
International Preliminary Report on Patentability of PCT Application No. PCT/JP2018/021142, dated Dec. 26, 2019, 09 pages of English Translation and 05 pages of IPRP.

* cited by examiner

FIG. 4

SIGNAL PROCESSING DEVICE AND METHOD, AND PROGRAM

CROSS REFERENCE TO RELATED APPLICATIONS

The present application is a continuation application of U.S. patent application Ser. No. 16/620,114, filed Dec. 6, 2019, which is a National Stage Entry of PCT/JP2018/021142, filed Jun. 1, 2018, and which claims priority from Japanese Patent Application No. JP 2017-118493, filed Jun. 16, 2017, the entire content of which is hereby incorporated by reference.

TECHNICAL FIELD

The present technology relates to a signal processing device and method, and a program, and more particularly, to a signal processing device and method, and a program that enable easier and more accurate failure detection.

BACKGROUND ART

In-car cameras for capturing an image around an automobile have been traditionally used to achieve various functions related to control of the automobile, such as a safety function of the automobile.

Such an in-car camera needs to be developed in accordance with the development process of international organization for standardization (ISO) 26262. In order to reduce a risk of failure due to the occurrence of a trouble, a safety mechanism is required to be disposed in such an in-car camera.

The safety mechanism needs to be disposed in accordance with an intended function, that is, the basic function of, for example, a camera. For example, detection during runtime is desired for detection of failure of a signal processing circuit in the in-car camera.

For example, technology of modulating a partial area of an image captured by a camera and combining a test pattern not visible enough for a user with the partial area is proposed as technology related to failure detection of the camera (e.g., see Patent Document 1).

In this technology, whether or not a signal processing circuit correctly operates, that is, whether or not the signal processing circuit has not failed is diagnosed by determining whether or not the test pattern combined with the image has been changed before and after processing in the signal processing circuit in the camera.

CITATION LIST

Patent Document

Patent Document 1: Japanese Patent Application Laid-Open No. 2016-008970

SUMMARY OF THE INVENTION

Problems to be Solved by the Invention

Unfortunately, the above-described technology has difficulty in achieving easy and accurate failure detection.

For example, the technology that combines a test pattern with a partial area of an image needs processing such as modulating the image and combining the test pattern. The technology needs complicated processing for failure detection.

Furthermore, in order to detect a failure of a signal processing circuit with high accuracy, failure detection is ideally performed with various test patterns. The above-described technology, however, combines the test pattern with the image, so that the test pattern needs to be invisible to a user. Then, only a limited test pattern can be used, and there is a possibility that a failure of the signal processing circuit cannot be detected with sufficient accuracy.

In addition, the test pattern is combined with the partial area of the image. In a case where the area with which the test pattern is combined is a target of processing such as object detection in a later stage of a camera, the test pattern combination may influence a processing accuracy in the later stage.

The present technology has been made in view of such a situation, and enables easier and more accurate failure detection.

Solutions to Problems

A signal processing device according to a first aspect of the present technology includes: an addition unit that adds test data for failure detection to valid data on which predetermined processing is to be performed, two or more samples processed in parallel in different paths having a same sample value in the test data; and a signal processing unit that performs the predetermined processing on the valid data and the test data that has been added to the valid data by a plurality of the paths.

A signal processing method or program according to the first aspect of the present technology includes the steps of: adding test data for failure detection to valid data on which predetermined processing is to be performed, two or more samples processed in parallel in different paths having a same sample value in the test data; and performing the predetermined processing on the valid data and the test data that has been added to the valid data by a plurality of the paths.

In the first aspect of the present technology, test data for failure detection is added to valid data on which predetermined processing is to be performed, two or more samples processed in parallel in different paths have a same sample value in the test data, and the predetermined processing is performed on the valid data and the test data that has been added to the valid data by a plurality of the paths.

A signal processing device according to a second aspect of the present technology includes: a reception unit that receives output data including valid data and test data for failure detection, the test data being added to the valid data, two or more samples processed in parallel in different paths having a same sample value in the test data; and a comparison unit that compares sample values of the two or more samples of the test data.

A signal processing method or program according to the second aspect of the present technology includes the steps of: receiving output data including valid data and test data for failure detection, the test data being added to the valid data, two or more samples processed in parallel in different paths having a same sample value in the test data; and comparing sample values of the two or more samples of the test data.

In the second aspect of the present technology, output data including valid data and test data for failure detection is received, the test data is added to the valid data, two or more samples processed in parallel in different paths have a same sample value in the test data, and sample values of the two or more samples of the test data are compared.

Effects of the Invention

According to the first and second aspects of the present technology, failure detection can be performed more easily and accurately.

Note that the effect described here is not necessarily limited, and any of the effects described in the present disclosure may be obtained.

BRIEF DESCRIPTION OF DRAWINGS

FIG. 4 illustrates an example of test data.

MODE FOR CARRYING OUT THE INVENTION

Hereinafter, embodiments to which the present technology has been applied will be described with reference to the drawings.

First Embodiment

<Configuration Example of Image Sensor>

The present technology enables easier and more accurate failure detection of a signal processing circuit by, in a case where valid data of, for example, image data is processed in a signal processing circuit including a plurality of paths, adding test data to the valid data and outputting the valid data to the signal processing circuit. In the test data, two or more samples processed in parallel in different paths have the same sample value.

In addition to in-car cameras and in-vehicle systems using the in-car cameras, the present technology as described above can be applied to, for example, cameras mounted in a moving body such as a motorcycle, a bicycle, an electric wheelchair, a personal mobility, an airplane, a ship, a train, and a robot, and systems using such a camera.

Furthermore, the signal processing circuit subject to failure detection in the present technology is not limited to the signal processing circuit that processes image data, and can be a signal processing circuit that processes any data such as voice data and measurement data.

More specific embodiments will now be described below.

Figure 1:
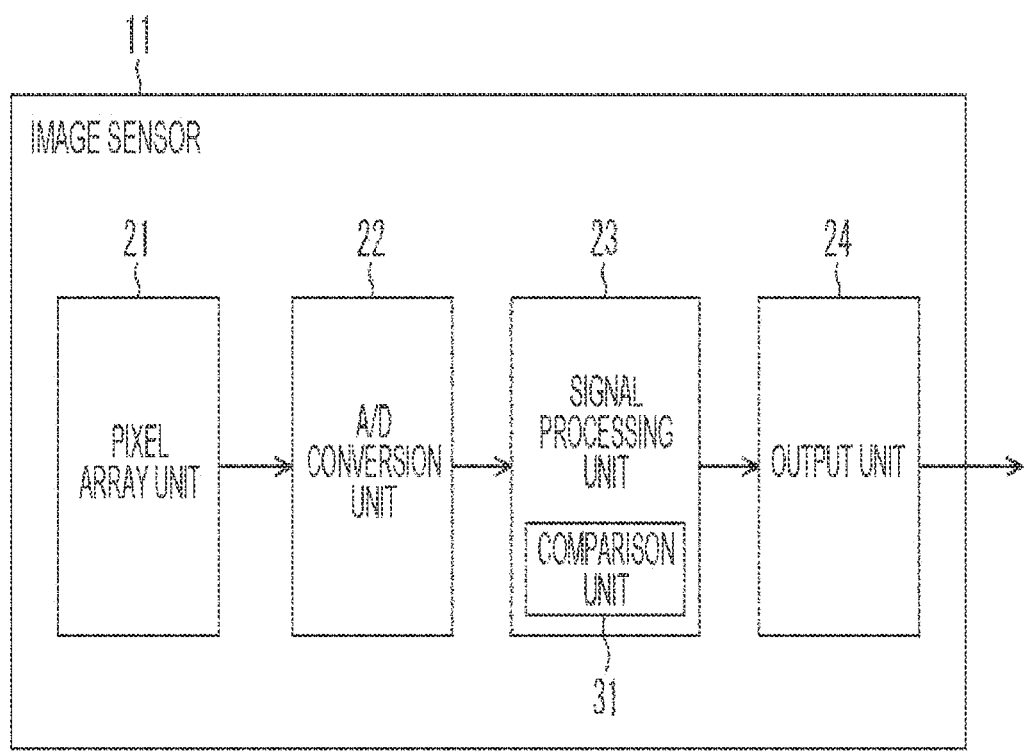
FIG. 1 illustrates a configuration example of an image sensor.

FIG. 1 illustrates a configuration example of one embodiment of an image sensor to which the present technology is applied.

An image sensor 11 illustrated in FIG. 1 is mounted in, for example, an imaging device such as an in-car camera, and outputs image data obtained by capturing an image of a surrounding object to the outside. Note that, in the following, the description will be continued assuming that the image sensor 11 is provided in an in-car camera.

The image sensor 11 includes a pixel array unit 21, an analog/digital (A/D) conversion unit 22, a signal processing unit 23, and an output unit 24.

The pixel array unit 21 includes a pixel array having a plurality of pixels arranged in row and column directions. An image of an object is captured by generating an analog image signal including a plurality of pixel signals. The pixel signals are obtained by each pixel receiving light incident from an object and performing photoelectric conversion. The pixel array unit 21 supplies the image signal obtained by the capturing to the A/D conversion unit 22.

Note that, although the image captured by the pixel array unit 21 may be a still image or a moving image, the description will be continued below assuming that the pixel array unit 21 captures a moving image.

The A/D conversion unit 22 converts the image signal that is an analog signal supplied from the pixel array unit 21 into image data that is a digital signal by AD conversion, and supplies the obtained image data to the signal processing unit 23. Such image data is to be processed by the signal processing unit 23, and such data is hereinafter also referred to as valid data.

The signal processing unit 23 includes, for example, a digital signal processing circuit having a plurality of paths. The signal processing unit 23 performs predetermined signal processing on the image data supplied from the A/D conversion unit 22 in a plurality of paths, and supplies the image data to the output unit 24. For example, the signal processing unit 23 performs processing, such as gain adjustment, clamp processing, and high dynamic range (HDR) combining processing, on the image data.

Furthermore, in the example, the signal processing unit 23 is defined as a detection target in failure detection, that is, a diagnosis target of failure. The signal processing unit 23 includes a comparison unit 31.

In the signal processing unit 23, test data of any pattern to be used for failure detection for the signal processing unit 23 is generated, and the test data is added to the image data, which is valid data, in the frontmost stage of the signal processing unit 23. Then, a signal processing block provided in the signal processing unit 23 performs various pieces of processing on the image data to which the test data has been added, that is, the image data and the test data. The obtained image data and test data is supplied to the output unit 24.

Furthermore, the test data that has been processed by the signal processing block is supplied also to the comparison unit 31, and the failure detection for the signal processing unit 23 is performed.

That is, the comparison unit 31 performs failure detection for the signal processing unit 23 by comparing sample values of predetermined samples of the test data, and outputs the detection result to the outside. Note that the detection result of the failure detection may be output to the outside via the output unit 24, or may be output to the outside not via the output unit 24.

The output unit 24 includes, for example, a digital circuit such as a mobile industry processor interface (MIPI) I/F. The output unit 24 converts the image data and the test data supplied from the signal processing unit 23 into output data in a format defined by a predetermined standard such as an MIPI, and outputs the output data to the outside.

Note that, in a case where a comparison unit similar to the comparison unit 31 is provided in, for example, the last stage in the output unit 24, the image sensor 11 can perform failure detection not only for the signal processing unit 23 but for the output unit 24.

Figure 2:
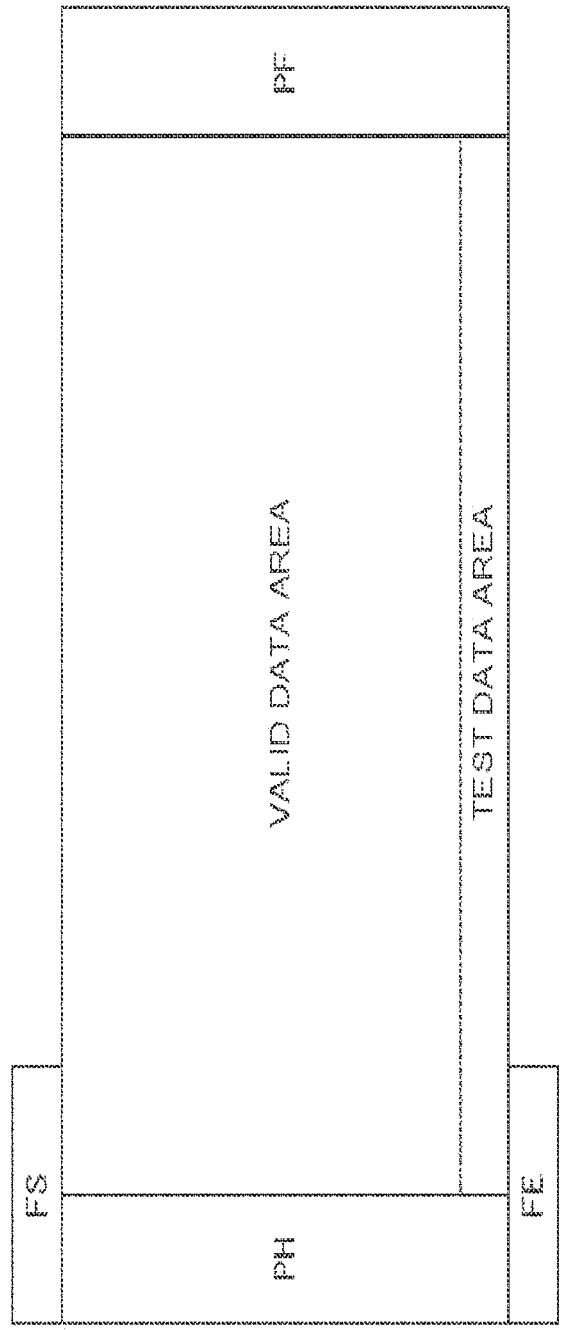
FIG. 2 illustrates a format example of output data.

Here, an example of output data output from the output unit 24 will be described. FIG. 2 illustrates a format example of one frame of output data output from the output unit 24, that is, one frame of image data.

In the example illustrated in FIG. 2, data from frame start (FS) to frame end (FE) is defined as one frame of output data. The output data includes one frame of image data and one frame of test data of a moving image.

That is, in the example, a valid data area and a test data area are provided between a packet header (PH) and a packet footer (PF).

Here, image data (valid data) obtained by capturing is stored in the valid data area. Test data generated at the signal processing unit 23 is stored in the test data area that follows the valid data area. In particular, in the example, a free area that can store any data different from the image data (valid data) is used as the test data area.

Therefore, in the example, the packet header (PH) and the packet footer (PF) are added to one row of image data constituting one frame of the moving image, and the image data of each row in the frame of the moving image is output. Similarly, the packet header and the packet footer are added to the test data, and the test data is output.

Note that the test data may have a length of one row of a frame of the moving image, or a length of several rows.

Furthermore, in a case where failure detection based on the test data is not particularly performed in a later stage of the image sensor 11, the test data does not need to be stored in the test data area. That is, output data that does not include test data and includes only image data is required to be output from the output unit 24.

<Configuration Example of Signal Processing Unit>

Then, a more specific configuration example of the signal processing unit 23 will be described.

Figure 3:
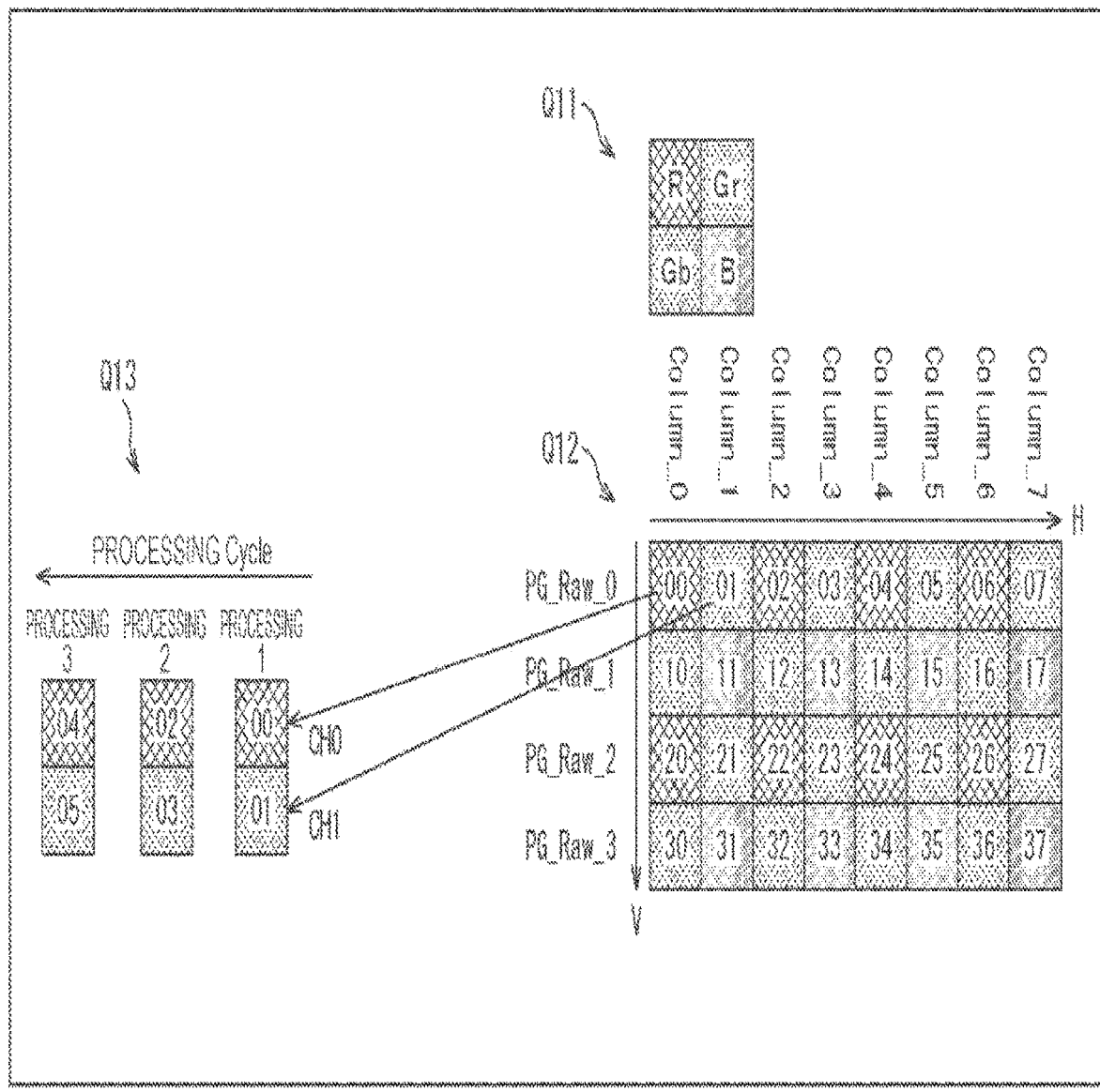
FIG. 3 illustrates a pixel array and a captured image.

For example, a pixel array in the pixel array unit 21 is assumed to be a Bayer array as indicated by an arrow Q11 in FIG. 3.

In the part indicated by the arrow Q11, each quadrangle represents one pixel, and letters written in the pixels indicate color filters provided in the pixels.

That is, a pixel with a letter "R" represents a pixel that includes a red (R) color filter and outputs a pixel signal of an R color component.

Furthermore, pixels with letters "Gr" or "Gb" represent pixels that include a green (G) color filter and output a pixel signal of a G color component. A pixel with a letter "B" represents a pixel that includes a blue (B) color filter and outputs a pixel signal of a B color component.

Hereinafter, the pixels with the letters "R", "Gr", "Gb", and "B" are also referred to as an R pixel, a Gr pixel, a Gb pixel, and a B pixel, respectively. Furthermore, in a case where the Gr pixel and the Gb pixel do not particularly need to be distinguished, the Gr pixel and the Gb pixel are also simply referred to as G pixels.

In the pixel array unit 21, the R pixel, Gr pixel, Gb pixel, and B pixel as described above are arranged in the Bayer array. An image signal of a color image, in which each pixel has a value of a component of any color of R, G, and B as a pixel value (sample value), is output from the pixel array unit 21.

Note that, although a case where the pixel array unit 21 is in the Bayer array will here be described as an example, the example is not limitative, and a color filter in the pixel array unit 21 may be in any other array. Furthermore, the image signal obtained at the pixel array unit 21 may be not an image signal of a color image but an image signal of a monochrome image.

Furthermore, the signal processing unit 23 includes two data paths (hereinafter simply referred to as paths). In other words, the signal processing unit 23 is a two-phased circuit.

In the case, as indicated by an arrow Q12 in FIG. 3, in a case where processing is performed on an image based on image data, two adjacent pixels are processed in parallel in different paths, that is, different channels.

A part indicated by the arrow Q12 represents a partial area of the pixel array unit 21, that is, a partial area of one frame of image (hereinafter also referred to as a captured image) based on the image data output from the A/D conversion unit 22. Each quadrangle represents one pixel.

Furthermore, in the part indicated by the arrow Q12, characters "PG_Raw_0" to "PG_Raw_3" indicate rows of the captured image, and characters "Column_0" to "Column_7" indicate columns of the captured image.

Moreover, the numbers written in the pixels indicate the rows and columns of the pixels. Letters "mn" are written in the pixel of the row of PG_Raw_m ($0 \le m \le 3$) and the column of Column_n ($0 \le n \le 7$). Hereinafter, the pixel of the row of PG_Raw_m ($0 \le m \le 3$) and the column of Column_n ($0 \le n \le 7$) is also referred to as a pixel mn.

Thus, for example, a pixel with characters "00" represents a pixel of the row of PG_Raw_0 and the column of Column_0. The pixel is hereinafter also referred to as a pixel 00.

Furthermore, the same hatching is applied to pixels of the same color component for the pixels of the part indicated by the arrow Q11 and the pixels of the part indicated by the arrow Q12. Thus, for example, the pixels 00 and 02 are R pixels, and the pixels 01 and 03 are G pixels.

In a case where a captured image is processed, the pixels 00 to 37 are processed basically in raster scan order.

Here, the signal processing unit 23 is two-phased and has two paths. In a case where the captured image is processed, the captured image is thus processed in the processing cycle indicated by an arrow Q13.

Specifically, the pixel 00 is first processed in a circuit provided in one pass (hereinafter also referred to as a channel CH0), and the pixel 01 adjacent to the pixel 00 is processed in a circuit provided in the other one path, that is, a channel (hereinafter also referred to as a channel CH1) different from the channel CH0 at substantially the same timing. That is, the pixels 00 and 01 are processed in parallel in the different channels CH0 and CH1.

In a case where the pixels 00 and 01 are processed, the pixel 02 is subsequently processed in the circuit of the channel CH0, and the pixel 03 is processed in the circuit of the channel CH1 at substantially the same timing. Moreover, a pixel 04 is processed in the circuit of the channel CH0, and a pixel 05 is processed in the circuit of the channel CH1 at substantially the same timing. Then, also after that, a pair of unprocessed pixels is processed in order in the circuits of different channels (paths).

Figure 4:
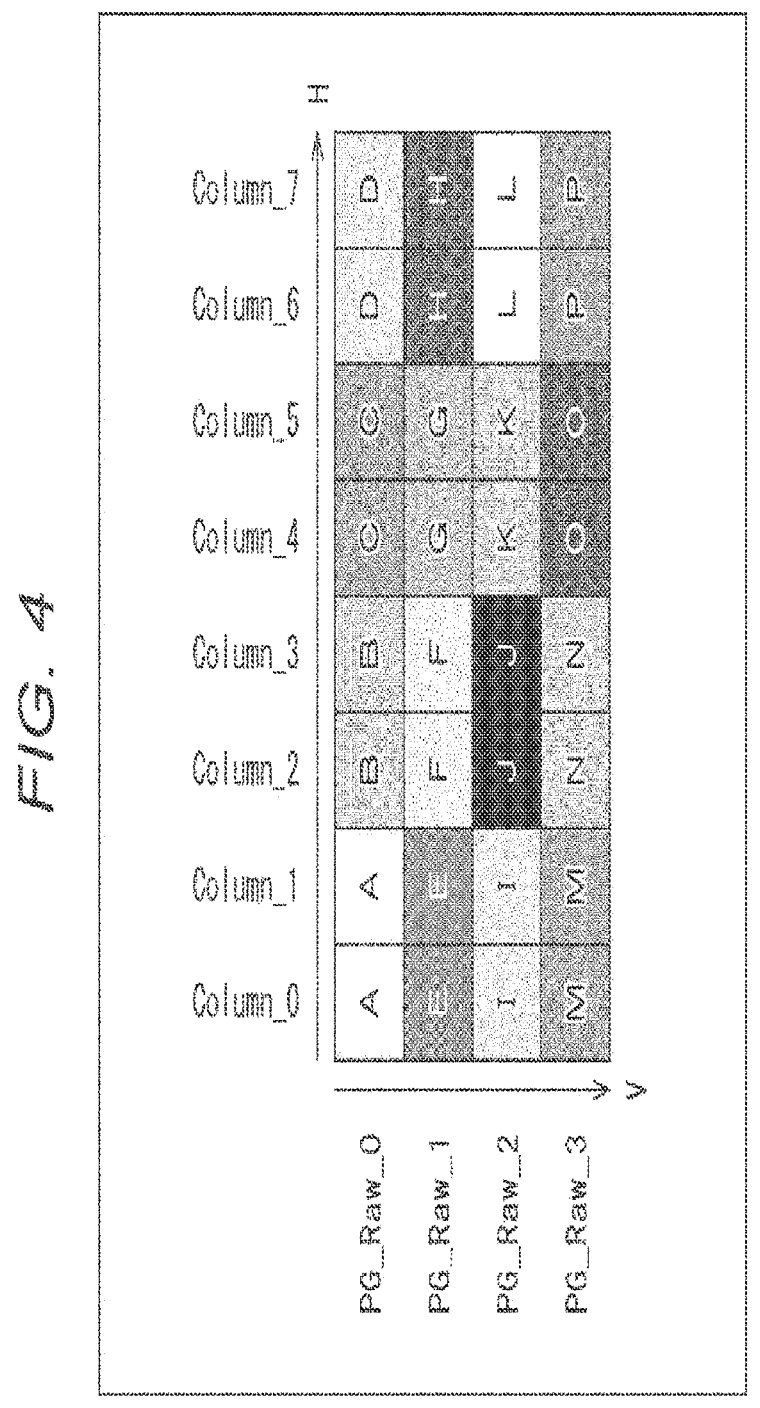

In a case where the signal processing unit 23 is two-phased, the signal processing unit 23 generates test data, for example, as illustrated in FIG. 4.

Note that, in FIG. 4, characters "PG_Raw_0" to "PG_Raw_3" indicate rows of test data corresponding to each row of the captured image, and characters "Column_0" to "Column_7" indicate columns of test data corresponding to each column of the captured image.

Furthermore, in FIG. 4, each quadrangle represents one pixel of the test data, more specifically, one sample corresponding to a pixel of the captured image, and letters in those pixels represent pixel values (sample values) of the pixels (samples) of the test data.

For example, in FIG. 4, the pixel of the test data in the row of PG_Raw_0 and the column of Column_0 corresponds to the pixel 00 illustrated in FIG. 3, and the pixel value of the pixel is A.

Similarly, the pixel of the test data in the row of PG_Raw_0 and the column of Column_1 corresponds to the pixel 01 illustrated in FIG. 3, and the pixel value of the pixel is A.

The pixel of the row of PG_Raw_0 and the column of Column_0 and the pixel of the row of PG_Raw_0 and the column of Column_1 are processed in different paths in the signal processing unit 23 at substantially the same timing, and these pixels have the same pixel value of value A.

Hereinafter, the pixel of the row of PG_Raw_m ($0 \leq m \leq 3$) and the column of Column_n ($0 \leq n \leq 7$) in the test data is also referred to as a pixel mn'.

The processing is performed by adding, for example, one frame of test data to the back of one frame of image data of the captured image, and assuming that the image data, to which the test data is added, up to the last part of the test data corresponds to the data of the captured image. In such a case, the processing is performed assuming that the pixel mn' has the same color component as the pixel mn.

Although each pixel mn' of the test data corresponds to each pixel mn of the image data in this way, the pixel mn' does not actually have a color component. That is, the pixel value of the pixel mn' is not a value of the same color component as a color component of the corresponding pixel mn, but merely a value of a test pattern.

In the test data illustrated in FIG. 4, adjacent two pixels (samples), which are processed in parallel by circuits of different paths (channels), have the same pixel value (sample value). That is, in the test data, two pixels, which are processed substantially the same timing in different paths, have the same pixel value.

Note that, as long as two pixels which are processed in parallel by circuits of different paths have the same pixel value, the test data may have any pattern, and the pixel value of each pixel may be determined in any way, for example, the pixel value of each pixel may be a random number.

For example, in the example illustrated in FIG. 4, each of pixel values A to P is, for example, a randomly generated value of a random number, and some of the pixel values A to P may have the same value.

The reason why the pixels processed in parallel in different paths of the signal processing unit 23 have the same pixel value in the test data is that the pixels are compared at the comparison unit 31 and failure detection is performed as described later.

Figure 5:
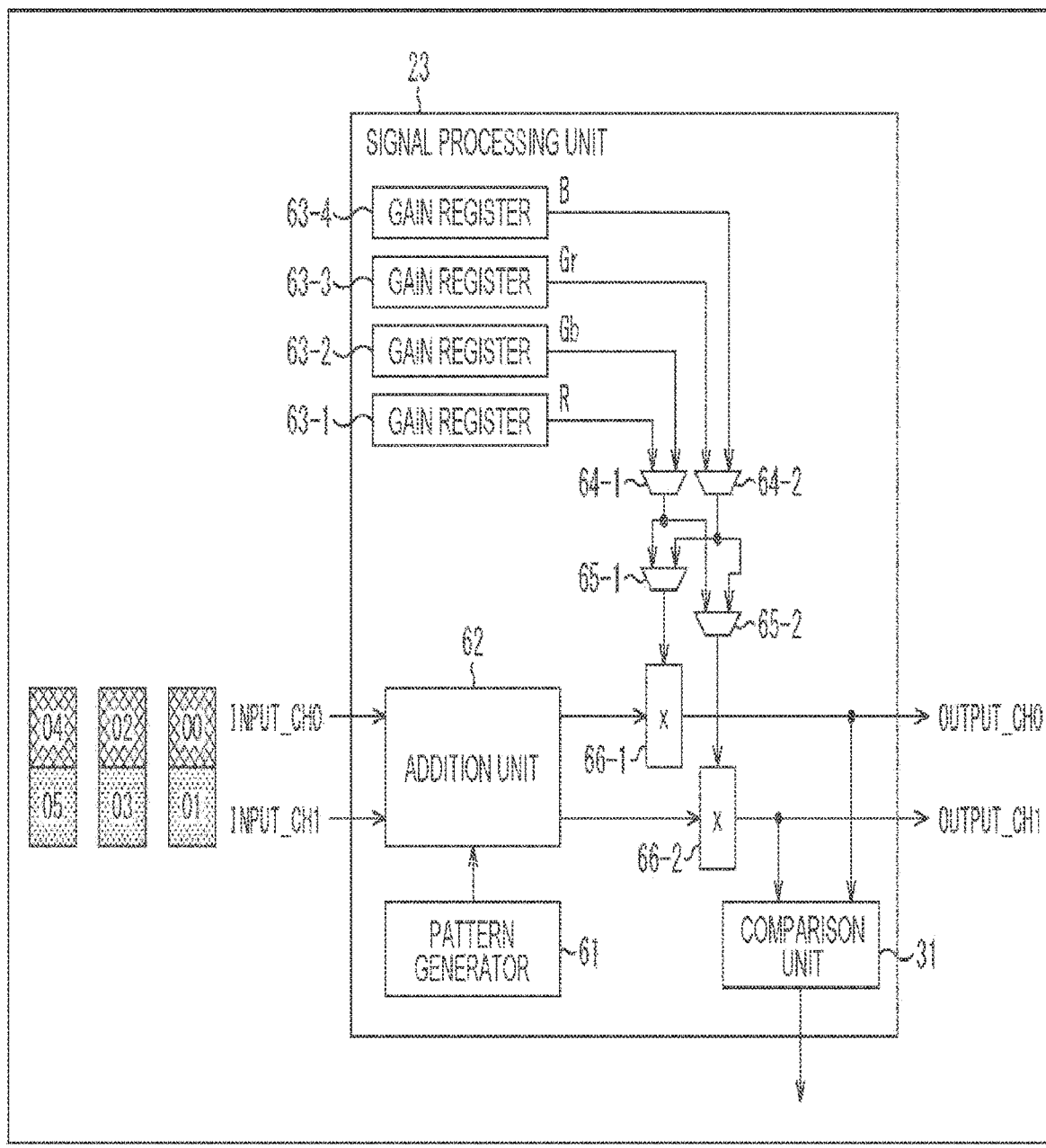
FIG. 5 illustrates a configuration example of a signal processing unit.

In a case where image data in the pixel array illustrated in FIG. 3 is obtained and test data of the pattern illustrated in FIG. 4 is generated as described above, the signal processing unit 23 has the configuration, for example, as illustrated in FIG. 5. Note that, in FIG. 5, the same signs are attached to the parts corresponding to those in FIG. 1, and the description thereof will be appropriately omitted.

The signal processing unit 23 illustrated in FIG. 5 includes a pattern generator 61, an addition unit 62, gain registers 63-1 to 63-4, selectors 64-1 and 64-2, selectors 65-1 and 65-2, multiplication units 66-1 and 66-2, and the comparison unit 31.

The signal processing unit 23 is a digital circuit that performs gain adjustment for input image data and test data. That is, the signal processing unit 23 performs the gain adjustment by multiplying each pixel of the image data and the test data by a gain in accordance with a color component of the pixel, more specifically, the pixel position.

The pattern generator 61 generates test data of the pattern illustrated in FIG. 4 by, for example, generating a random number, and supplies the test data to the addition unit 62. For example, the test data is, for example, data of the number of several lines of pixels of the captured image. The pattern generator 61 as described above functions as a test data generation unit that generates test data. Note that the pixel value of each pixel of the test data is not limited to a random number, and may be a predetermined value.

The addition unit 62 adds the test data supplied from the pattern generator 61 to the image data supplied from the A/D conversion unit 22, and supplies the image data, to which the test data is added, to the multiplication units 66-1 and 66-2.

Specifically, for example, one frame of image data illustrated in FIG. 3 is supplied to the addition unit 62, and one frame of test data illustrated in FIG. 4 is supplied to the addition unit 62.

In such a case, the addition unit 62 first supplies the pixel 00 of the image data to the multiplication unit 66-1, and supplies the pixel 01 of the image data to the multiplication unit 66-2.

Here, the multiplication unit 66-1 is a multiplication circuit provided in a path corresponding to the channel CH0. The multiplication unit 66-2 is a multiplication circuit provided in a path corresponding to the channel CH1.

Furthermore, at the next timing, the addition unit 62 supplies the pixel 02 of the image data to the multiplication unit 66-1, and also supplies the pixel 03 of the image data to the multiplication unit 66-2. In this way, the addition unit 62 sequentially supplies the pixel of the image data to the multiplication units 66-1 and 66-2.

Then, the addition unit 62 starts supplying the test data to the multiplication units 66-1 and 66-2 at the next timing after the addition unit 62 supplies the last pixel of one frame of image data to the multiplication unit 66-2.

That is, the addition unit 62 first supplies a pixel 00' of the test data to the multiplication unit 66-1, and supplies a pixel 01' of the test data to the multiplication unit 66-2. Furthermore, at the next timing, the addition unit 62 supplies a pixel 02' of the test data to the multiplication unit 66-1, and supplies a pixel 03' of the test data to the multiplication unit 66-2.

Thereafter, similarly, the addition unit 62 sequentially supplies pixels of the test data to the multiplication units 66-1 and 66-2.

As described above, the addition unit 62 repeatedly performs processing of outputting one frame of image data of the captured image and then outputting one frame of test data.

The gain registers 63-1 to 63-4 store gains (gain values) corresponding to respective color components.

That is, the gain register 63-1 holds a gain (hereinafter also referred to as a gain R) by which an R pixel is multiplied, and supplies the held gain to the selector 64-1.

The gain register 63-2 holds a gain (hereinafter also referred to as a gain Gb) by which a Gb pixel is multiplied, and supplies the held gain to the selector 64-1.

The gain register 63-3 holds a gain (hereinafter also referred to as a gain Gr) by which a Gr pixel is multiplied, and supplies the held gain to the selector 64-2.

The gain register 63-4 holds a gain (hereinafter also referred to as a gain B) by which a B pixel is multiplied, and supplies the held gain to the selector 64-2.

Note that, in a case where the gain registers 63-1 to 63-4 do not particularly need to be distinguished, the gain registers 63-1 to 63-4 are also hereinafter simply referred to as gain registers 63. Furthermore, the gains R, Gb, Gr, and B have different values.

The selector 64-1 selects one of the gain R supplied from the gain register 63-1 and the gain Gb supplied from the gain register 63-2, and supplies the selected gain to the selectors 65-1 and 65-2.

Furthermore, the selector 64-2 selects one of the gain Gr supplied from the gain register 63-3 and the gain B supplied from the gain register 63-4, and supplies the selected gain to the selectors 65-1 and 65-2.

Note that, in a case where the selectors 64-1 and 64-2 do not particularly need to be distinguished, the selectors 64-1 and 64-2 are also hereinafter simply referred to as selectors 64.

The selector 65-1 selects one of the gain supplied from the selector 64-1 and the gain supplied from the selector 64-2, and supplies the selected gain to the multiplication unit 66-1.

Furthermore, the selector 65-2 selects one of the gain supplied from the selector 64-1 and the gain supplied from the selector 64-2, and supplies the selected gain to the multiplication unit 66-2.

Note that, in a case where the selectors 65-1 and 65-2 do not particularly need to be distinguished, the selectors 65-1 and 65-2 are also hereinafter simply referred to as selectors 65.

The multiplication unit 66-1 multiplies a pixel of the image data or a pixel of the test data supplied from the addition unit 62 by the gain supplied from the selector 65-1, and supplies the pixel that has been multiplied by the gain to the comparison unit 31 and the output unit 24.

The multiplication unit 66-2 multiplies a pixel of the image data or a pixel of the test data supplied from the addition unit 62 by the gain supplied from the selector 65-2, and supplies the pixel that has been multiplied by the gain to the comparison unit 31 and the output unit 24.

Note that, in a case where the multiplication units 66-1 and 66-2 do not particularly need to be distinguished, the multiplication units 66-1 and 66-2 are also hereinafter simply referred to as multiplication units 66.

The comparison unit 31 performs failure detection for the signal processing unit 23 by comparing a pixel of the test data after multiplication by the gain supplied from the multiplication unit 66-1 to a pixel of the test data after multiplication by the gain supplied from the multiplication unit 66-2, and outputs the detection result.

Specifically, in a case where the pixel value of the pixel of the test data supplied from the multiplication unit 66-1 matches the pixel value of the pixel of the test data supplied from the multiplication unit 66-2, that is, the pixel values are the same, it is determined that no failure has occurred in the signal processing unit 23.

In contrast, in a case where the pixel value of the pixel of the test data supplied from the multiplication unit 66-1 does not match the pixel value of the pixel of the test data supplied from the multiplication unit 66-2, that is, the pixel values are different, it is determined that a failure has occurred in the signal processing unit 23.

In this way, the comparison unit 31 performs failure detection by comparing pixel values of two pixels supplied through the addition unit 62 and the multiplication unit 66, and thus, the pixels compared at the comparison unit 31 have the same pixel value in the test data.

Furthermore, here, failure detection is performed on the part of the addition unit 62 or the multiplication unit 66 in the signal processing unit 23. That is, in a case where any part of the addition unit 62 or the multiplication unit 66 does not operate correctly due to, for example, a failure, a detection result (determination result) indicating that a failure (error) has occurred in the comparison unit 31 is obtained.

As described above, the signal processing unit 23 functions as a block that performs gain adjustment for a captured image. Thus, the captured image is subject to gain adjustment by the multiplication unit 66 multiplying the R pixel, the Gb pixel, the Gr pixel, and the B pixel of the captured image by the gain R, the gain Gb, the gain Gr, and the gain B, respectively.

Thus, the selectors 64 and 65 selects a gain such that a pixel of each color is multiplied by the gain of the color for the image data of the captured image.

For example, as can be seen from the pixel array illustrated in FIG. 3, one of the R pixel and the Gb pixel is supplied to the multiplication unit 66-1 of the channel CH0.

Therefore, the selector 64-1 supplies one of the gain R and the gain Gb to the selector 65 in accordance with the color component of a pixel supplied to the multiplication unit 66-1. Furthermore, the selector 65-1 continuously selects the gain supplied from the selector 64-1, and supplies the gain to the multiplication unit 66-1 during processing of the captured image.

Similarly, one of the Gr pixel and the B pixel is supplied to the multiplication unit 66-2 of the channel CH1. Therefore, the selector 64-2 supplies one of the gain Gr and the gain B to the selector 65 in accordance with the color component of a pixel supplied to the multiplication unit 66-2. Furthermore, the selector 65-2 continuously selects the gain supplied from the selector 64-2, and supplies the gain to the multiplication unit 66-2 during processing of the captured image.

Although the selector 65 is unnecessary during processing of the captured image in this way, the selector 65 is needed in a case where processing on one frame of the captured image ends and the test data is supplied to the multiplication unit 66.

For example, assuming that there is no selector 65, the pixel 00' of the test data illustrated in FIG. 4 is supplied to the multiplication unit 66-1, and at the timing when the pixel 01' of the test data is supplied to the multiplication unit 66-2, the gains R and Gr are supplied to the multiplication units 66-1 and 66-2, respectively.

Then, a pixel value A×R and a pixel value A×Gr are supplied to the comparison unit 31, and these pixel values are compared. The pixel value A×R is obtained by multiplying the pixel value A of the pixel 00' by the gain R. The pixel value A×Gr is obtained by multiplying the pixel value A of the pixel 01' by the gain Gr.

In this case, even the signal processing unit 23 does not particularly fail and the addition unit 62 and the multiplication unit 66 correctly operate, the gain R and the gain Gr are different, so that the pixel values of compared pixels do not match each other. This leads to determination of the occurrence of failure. That is, erroneous detection occurs.

Therefore, in order to supply the same gain to the two multiplication units 66 during processing of test data, the selector 65 selects the gain supplied from the selector 64. In other words, in a case where the multiplication unit 66 performs processing depending on the color component of the pixel on the image data of captured image, the selector 65 functions as a selection unit that selects processing in the multiplication unit 66 so that the same processing is performed in the two multiplication units 66, that is, the same processing is performed on a pair of compared pixels of test data.

Note that the selector 65 selects processing (gain) in accordance with the color component of a pixel to be processed of image data during processing of the image data that is valid data.

As a specific example, the selector 65 selects the gain R or the gain Gr, for example, at the timing when the pixels 00' and 01' of the test data are processed.

For example, in a case where the gain R is selected, the gain R is selected in both the selector 65-1 and the selector 65-2, and supplied to the multiplication unit 66.

In such a way, a pixel value A×R and another pixel value A×R are supplied to the comparison unit 31, and these pixel values are compared. The former pixel value A×R is obtained by multiplying the pixel value A of the pixel 00' by the gain R. The latter pixel value A×R is obtained by multiplying the pixel value A of the pixel 01' by the gain R.

In this case, in a case where the signal processing unit 23 does not particularly fail and the addition unit 62 and multiplication unit 66 correctly operate, the pixel values of compared pixels match each other. As a result of failure detection, correct detection result can be obtained.

In particular, the signal processing unit 23 is only required to input test data to a circuit such as the multiplication unit 66, perform processing similar to that originally performed on the image data to be processed at the signal processing unit 23, and compare the pixel values of pixels corresponding to the test data output from the circuit. Therefore, failure detection can be performed by simple processing.

That is, in the present technology, there is no need to perform switching such as switching a parameter such as a gain supplied to the multiplication unit 66 for failure detection to a dedicated parameter for failure detection. Furthermore, processing such as modulation on image data in accordance with test data is unnecessary, and only simple comparison of pixels is required. This enables simple failure detection in the present technology.

Moreover, even in a case where a user sets a parameter of processing to be performed at the signal processing unit 23, such as a gain stored in the gain register 63, failure detection can be correctly performed. Failure detection is performed by using not a parameter for failure detection but a parameter actually set by the user, and thus failure can be detected with high accuracy in the actual operation environment.

Furthermore, the signal processing unit 23 illustrated in FIG. 5 includes the addition unit 62 and the comparison unit 31. The addition unit 62 is provided in the frontmost stage of the signal processing unit 23, and adds test data to image data. The comparison unit 31 is provided in the last stage of the signal processing unit 23, and performs failure detection. Therefore, the signal processing unit 23 can perform failure detection for the widest range.

Moreover, configuration for performing failure detection by comparing two pixels of test data using the architecture of the signal processing unit 23 is adopted while taking advantage of the feature that the signal processing unit 23 is multi-phased. This enables failure detection with simple configuration, and can inhibit an increase in circuit scale.

In addition, the signal processing unit 23 adds test data for failure detection after image data that is valid data for each frame of a captured image, and performs failure detection during a blanking period of the captured image. This enables failure detection during runtime, that is, during processing of the captured image. In particular, since data of one frame of image data is not used as test data, failure detection can be performed in time shorter than a time period of one frame.

In addition, since the signal processing unit 23 does not process image data that is valid data for failure detection, there is no possibility of influencing the processing using the image data in the later stage, and any pattern can be generated as a pattern of test data.

This enables pixel value of each pixel of test data to change to various values to vary a pattern. Furthermore, since processing is performed on test data with various values set by a user with respect to a parameter such as a gain of the gain register 63, failure detection can be performed with much more parameters or test patterns. This can improve detection accuracy of failure detection.

<Description of Data Output Processing>

Then, operations of the image sensor 11 illustrated in FIG. 1 will be described.

Figure 6:
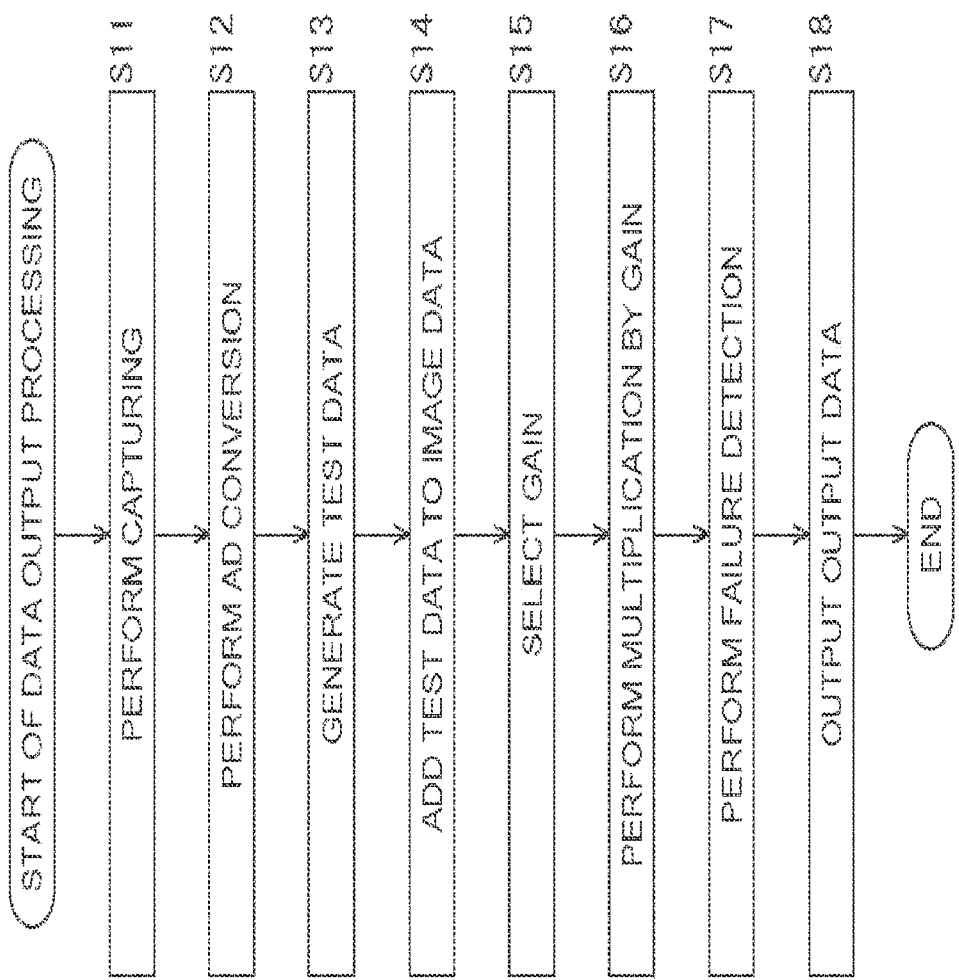
FIG. 6 is a flowchart illustrating data output processing.

That is, data output processing performed by the image sensor 11 will be described below with reference to the flowchart of FIG. 6.

In Step S11, the pixel array unit 21 captures a captured image by receiving light incident from an object and performing photoelectric conversion, and supplies an image signal of the resulting captured image to the A/D conversion unit 22.

In Step S12, the A/D conversion unit 22 performs AD conversion on an image signal of the captured image supplied from the pixel array unit 21, and supplies resulting image data of the captured image to the addition unit 62 of the signal processing unit 23.

In Step S13, the pattern generator 61 generates test data of any pattern by generating a random number, and supplies the test data to the addition unit 62.

In Step S13, data in which pixels (samples) processed in parallel in different paths (channels) of the signal processing unit 23 have the same pixel value (sample value) is generated as test data. Specifically, for example, the test data illustrated in FIG. 4 is generated.

In Step S14, the addition unit 62 adds the test data supplied from the pattern generator 61 to the image data supplied from the A/D conversion unit 22, and supplies the image data to the multiplication unit 66. That is, one frame of test data is added to the back of the image data of each frame of the captured image, and the image data is output to the multiplication unit 66.

In Step S15, the selectors 64 and 65 select a gain to be supplied to the multiplication unit 66 from the gains supplied from the gain register 63.

For example, the selector 64 selects a gain of a color component determined with respect to the pixel position of the image data or the test data supplied to the multiplication unit 66 from the gains that have been supplied from the gain register 63, and supplies the selected gain to the selector 65.

Furthermore, the selector 65 selects a gain of a color component determined with respect to the pixel position of the image data supplied to the multiplication unit 66, which is an output destination of the gain, from the gains that have been supplied from the selector 64, and supplies the selected gain to the multiplication unit 66 at the timing when a pixel of the image data is supplied to the multiplication unit 66.

In contrast, the selector 65 selects a predetermined gain from the gains that have been supplied from the selector 64 so that gains having the same color component are supplied to the two multiplication units 66, and supplies the selected gain to the multiplication unit 66 at the timing when a pixel of the test data is supplied to the multiplication unit 66.

In Step S16, the multiplication unit 66 multiplies the image data or the test data that has been supplied from the addition unit 62 by the gain that has been supplied from the selector 65, and supplies the data to the output unit 24 and the comparison unit 31.

In Step S17, the comparison unit 31 performs failure detection by comparing a pixel value of a pixel of the test data after multiplication by the gain supplied from the multiplication unit 66-1 to a pixel value of a pixel of the test data after multiplication by the gain supplied from the multiplication unit 66-2.

That is, in a case where the pixel values of two pixels match each other, the comparison unit 31 outputs a detection result indicating that no failure has occurred, and in a case where the pixel values of the two pixels do not match each other, the comparison unit 31 outputs a detection result indicating that a failure has occurred. Such failure detection is performed for each pair of pixels of test data in each frame of the captured image.

In Step S18, the output unit 24 converts the image data and test data that have been supplied from the multiplication unit 66 into output data in a predetermined format, and outputs the output data. Then, the data output processing ends. For example, in Step S18, output data, in the format illustrated in FIG. 2, including image data and test data is generated and output.

Note that, in Step S18, at least the image data that has been converted into the predetermined format is required to be output, and test data is not necessarily required to be output.

As described above, the image sensor 11 generates test data in which a plurality of pixels processed in parallel in different paths has the same pixel value, and performs failure detection on the basis of the test data that has been processed at the multiplication unit 66. This enables easier and more accurate failure detection.

Note that, although an example in which the signal processing unit 23 performs gain adjustment has been described above, processing performed by the signal processing unit 23 on image data and test data is not limited to the gain adjustment as described above, and any processing may be performed.

That is, clamp processing for fixing a black level of a captured image and HDR combining processing for combining a plurality of captured images may be performed on, for example, image data and test data.

Furthermore, processing performed by the signal processing unit 23 on image data and test data is not required to depend on a color filter, that is, a color component. For example, in a case where a captured image is a monochrome image and each pixel of the captured image is multiplied by a gain of the same value, the selectors 64 and 65 are unnecessary in the configuration illustrated in FIG. 5, and a gain is only required to be directly supplied from a gain register to the multiplication unit 66.

Moreover, although an example in which the signal processing unit 23 is subject to failure detection has been described in the image sensor 11 illustrated in FIG. 1, failure detection can be performed not only for the signal processing unit 23 but for the output unit 24 by providing the comparison unit 31 in the output unit 24.

For example, in a case where the comparison unit 31 is provided at the last stage of the output unit 24, failure detection can be performed for a path (circuit) from the addition unit 62 of the signal processing unit 23 to the last stage of the output unit 24. In addition, the comparison unit may be provided only in the output unit 24 in this case. In a case where comparison units are provided in both the signal processing unit 23 and the output unit 24, however, it is possible to determine, in a case where the failure occurs, at which of the signal processing unit 23 and the output unit 24 a failure has occurred.

Furthermore, the test data may be input not from a digital block (digital circuit) such as the signal processing unit 23 but from an analog block (analog circuit).

In such a case, for example, the pattern generator 61 and the addition unit 62 are provided in the pixel array unit 21. Analog test data is added to an image signal obtained by capturing, and supplied from the pixel array unit 21 to the A/D conversion unit 22.

Then, the A/D conversion unit 22 performs AD conversion on the pixel signal and test data supplied from the pixel array unit 21. The resulting image data and test data are supplied to the multiplication unit 66 of the signal processing unit 23. Therefore, failure detection can be performed for the A/D conversion unit 22 and the signal processing unit 23.

<Variation 1 of First Embodiment>
<Configuration Example of Signal Processing Unit>

Moreover, although an example in which two paths are provided in the signal processing unit 23 has been described above, three or more paths may be provided. In such a case, patterns of test data may be determined in accordance with the number of the paths provided in the signal processing unit 23.

Here, for example, a case where the signal processing unit 23 is four-phased, that is, a case where four paths (channels) are provided in the signal processing unit 23 will be described as a specific example.

Figure 7:
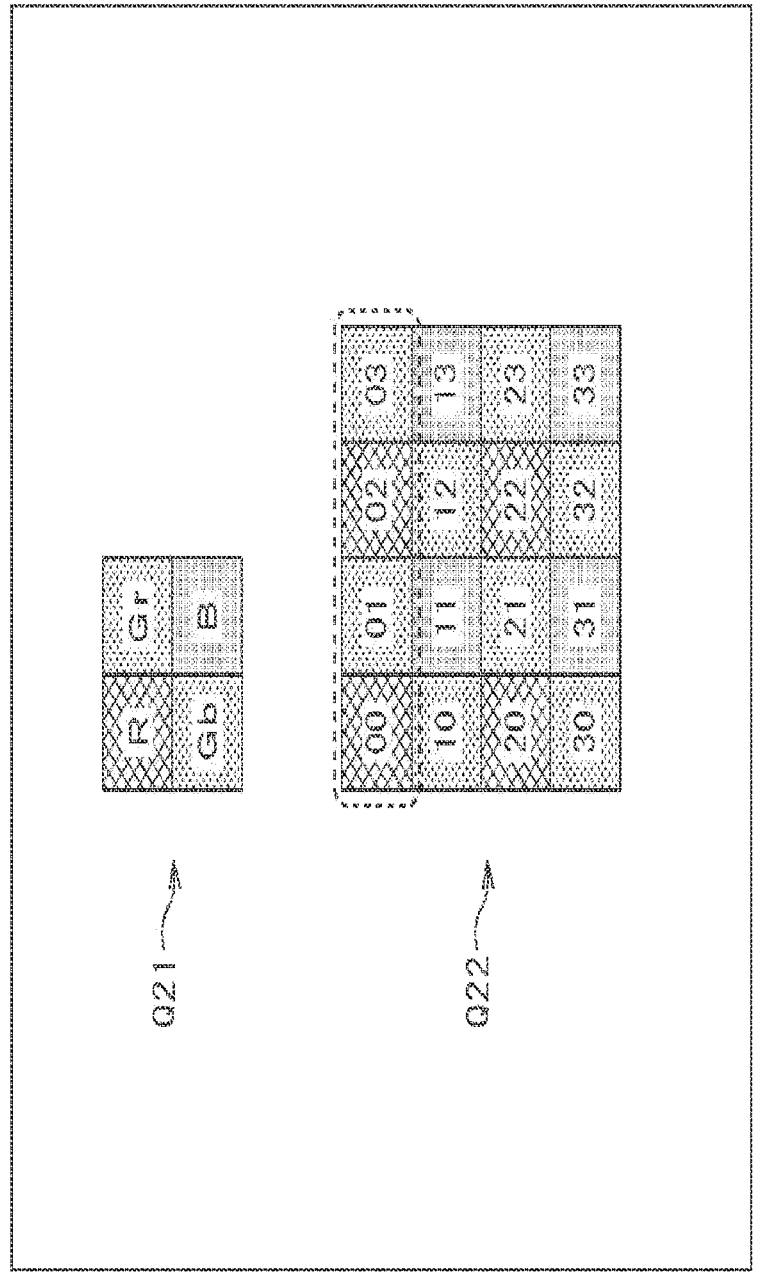
FIG. 7 illustrates a pixel array and a captured image.

For example, in a case where the pixel array of the pixel array unit 21 is a Bayer array as indicated by an arrow Q21 in FIG. 7, a partial area of a captured image is as indicated by an arrow Q22.

Note that, in the part indicated by the arrow Q21 in FIG. 7, each quadrangle represents one pixel, and pixels with letters "R", "Gr", "Gb", and "B" are an R pixel, a Gr pixel, a Gb pixel, and a B pixel, respectively.

Furthermore, in the part indicated by the arrow Q22, each quadrangle represents one pixel of a captured image, and numbers in the pixel represent the row and column of the pixel. That is, similarly to the example illustrated in FIG. 3, letters "mn" is written in the pixel of the row of PG_Raw_m and the column of Column_n. Such a pixel is also referred to as a pixel mn.

In a case where such a captured image is obtained and the signal processing unit 23 has a four-phased structure, four pixels adjacent in the row direction are processed in parallel by different paths.

That is, for example, pixels 00, 01, 02, and 03 are processed at substantially the same timing in different paths.

Hereinafter, paths in which each of the pixels 00, 01, 02, and 03 is processed are also referred to as channels CH0, CH1, CH2, and CH3, respectively.

In a case where a color captured image is processed in four paths in this way, test data in which at least two or more pixels, among four pixels (samples) processed in parallel in different paths, have the same pixel value (sample value) is only required to be generated. That is, test data in which, for example, two pixels corresponding to the same color component, among four pixels processed in parallel in different paths, have the same pixel value is only required to be generated.

Specifically, the pixel in the row of PG_Raw_m and the column of Column_n of the test data are denoted as a pixel mn', for example, similarly to the case described with reference to FIG. 4.

In this case, for example, the pixel 00' of the test data corresponds to the pixel 00 of an R component, and the pixel 00' is processed in a circuit of the channel CH0. Furthermore, the pixel 01' of the test data corresponds to the pixel 01 of a Gr component, and the pixel 01' is processed in a circuit of the channel CH1.

Similarly, the pixel 02' of the test data corresponds to the pixel 02 of the R component, and is processed in the circuit of the channel CH2. The pixel 03' of the test data corresponds to the pixel 03 of the Gr component, and is processed in a circuit of the channel CH3.

Therefore, test data in which, for example, the pixels 00' and 02' corresponding to the R component (R pixel) have the same pixel value and the pixels 01' and 03' corresponding to the Gr component (Gr pixel) have the same pixel value is only required to be generated.

Figure 8:
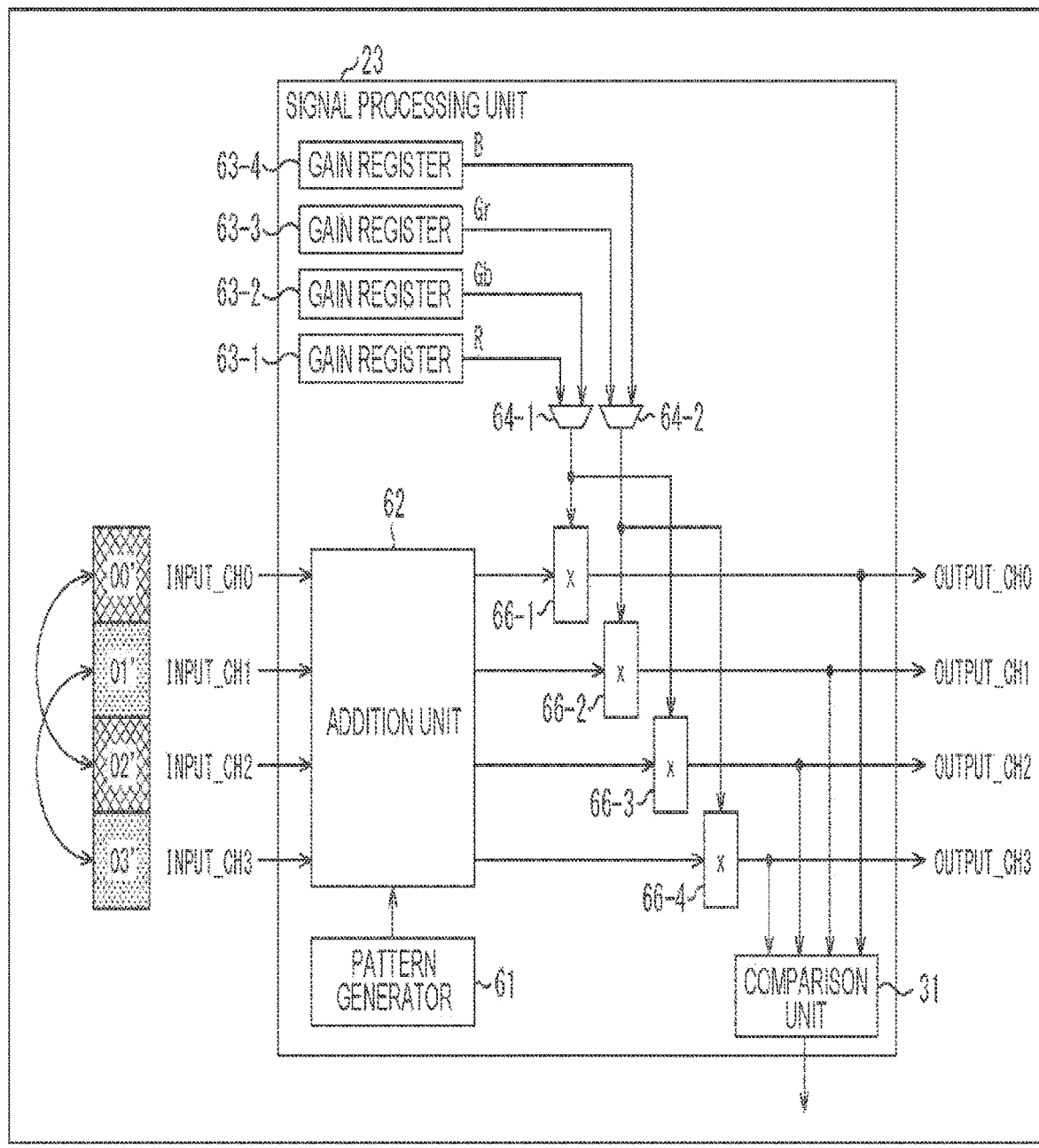
FIG. 8 illustrates a configuration example of the signal processing unit.

Furthermore, in such a case, the four-phased signal processing unit 23 has the configuration illustrated in FIG. 8, for example. Note that, in FIG. 8, the same signs are attached to the parts corresponding to those in FIG. 5, and the description thereof will be appropriately omitted.

The signal processing unit 23 illustrated in FIG. 8 includes the pattern generator 61, the addition unit 62, the gain registers 63-1 to 63-4, the selectors 64-1 and 64-2, the multiplication units 66-1 and 66-2, multiplication units 66-3 and 66-4, and the comparison unit 31.

The configuration of the signal processing unit 23 illustrated in FIG. 8 differs from that of the signal processing unit 23 in FIG. 5 in that the selectors 65-1 and 65-2 are not provided and the multiplication units 66-3 and 66-4 are newly provided.

In the example, each of the multiplication units 66-1 to 66-4 is a circuit provided in each of the channels CH0 to CH3.

The multiplication units 66-1 and 66-3 multiply a pixel of the image data and a pixel of the test data supplied from the addition unit 62 by the gain supplied from the selector 64-1, and supplies the pixel that has been multiplied by the gain to the comparison unit 31 and the output unit 24.

The multiplication units 66-2 and 66-4 multiply a pixel of the image data and a pixel of the test data supplied from the addition unit 62 by the gain supplied from the selector 64-2, and supplies the pixel that has been multiplied by the gain to the comparison unit 31 and the output unit 24.

Note that, in a case where the multiplication units 66-1 to 66-4 do not particularly need to be distinguished, the multiplication units 66-1 to 66-4 are also hereinafter simply referred to as multiplication units 66.

The signal processing unit 23 having the configuration illustrated in FIG. 8 performs processing on four pixels of input image data and test data in parallel.

For example, in a case where the image data illustrated in FIG. 7 is supplied to the addition unit 62, the addition unit 62 supplies the pixel 00 of the image data to the multiplication unit 66-1 of the channel CH0, and supplies the pixel 01 of the image data to the multiplication unit 66-2 of the channel CH1. Furthermore, the addition unit 62 supplies the pixel 02 of the image data to the multiplication unit 66-3 of the channel CH2, and supplies the pixel 03 of the image data to the multiplication unit 66-4 of the channel CH3.

In this case, the selector 64-1 selects a gain R, and supplies the gain R to the multiplication units 66-1 and 66-3.

The selector 64-2 selects a gain Gr, and supplies the gain Gr to the multiplication units 66-2 and 66-4.

Then, the multiplication units 66-1 and 66-3 perform gain adjustment by multiplying the pixel values of each of the pixels 00 and 02 supplied from the addition unit 62 by the gain R supplied from the selector 64-1, and supply the pixels 00 and 02 that have been multiplied by the gain R to the output unit 24 and the comparison unit 31.

Similarly, the multiplication units 66-2 and 66-4 perform gain adjustment by multiplying the pixel values of each of the pixels 01 and 03 supplied from the addition unit 62 by the gain Gr supplied from the selector 64-2, and supply the pixels 01 and 03 that have been multiplied by the gain Gr to the output unit 24 and the comparison unit 31.

Furthermore, the pattern generator 61 generates test data in which pixels processed in parallel in the channels CH0 and CH2 have the same pixel value and pixels processed in parallel in the channels CH1 and CH3 have the same pixel value, and supplies the test data to the addition unit 62.

In this case, as described above, test data in which, for example, the pixels 00' and 02' have the same pixel value and the pixels 01' and 03' have the same pixel value is generated.

The addition unit 62 supplies one frame of image data of a captured image to the multiplication unit 66, and then supplies one frame of test data supplied from the pattern generator 61 to the multiplication unit 66.

For example, the addition unit 62 supplies each of the pixels 00' to 03' of the test data to each of the multiplication units 66-1 to 66-4, and then similarly supplies pixels of the test data to the multiplication unit 66.

Furthermore, the selector 64 selects a gain similarly to when the image data is supplied to the multiplication unit 66, and supplies the selected gain to the multiplication unit 66.

That is, the selector 64-1 selects a gain R, and supplies the gain R to the multiplication units 66-1 and 66-3 at the timing when the pixels 00' and 02' are supplied to, for example, the multiplication units 66-1 and 66-3. Then, the multiplication units 66-1 and 66-3 multiply the pixels 00' and 02' supplied from the addition unit 62 by the gain R, and supply the pixels 00' and 02' to the output unit 24 and the comparison unit 31.

Furthermore, the selector 64-2 selects a gain Gr, and supplies the gain Gr to the multiplication units 66-2 and 66-4 at the timing when the pixels 01' and 03' are supplied to the multiplication units 66-2 and 66-4. Then, the multiplication units 66-2 and 66-4 multiply the pixels 01' and 03' supplied from the addition unit 62 by the gain Gr, and supply the pixels 01' and 03' to the output unit 24 and the comparison unit 31.

In this case, the comparison unit 31 compares the pixel value of the pixel 00' that has been multiplied by the gain R to the pixel value of the pixel 02' that has been multiplied by the gain R. In a case where the pixel values do not match each other, the comparison unit 31 outputs a detection result indicating that a failure has occurred.

Furthermore, the comparison unit 31 compares the pixel value of the pixel 01' that has been multiplied by the gain Gr to the pixel value of the pixel 03' that has been multiplied by the gain Gr. In a case where the pixel values do not match each other, the comparison unit 31 outputs a detection result indicating that a failure has occurred.

In contrast, in a case where the pixel value of the pixel 00' that has been multiplied by the gain R and the pixel value of the pixel 02' that has been multiplied by the gain R match each other and the pixel value of the pixel 01' that has been multiplied by the gain Gr and the pixel value of the pixel 03' that has been multiplied by the gain Gr match each other, the comparison unit 31 outputs a detection result indicating that no failure has occurred.

In a case where the signal processing unit 23 is four-phased, the selector 65 is unnecessary since there is a plurality of pixels of the same color component among four pixels processed in parallel.

Note that the signal processing unit 23 illustrated in FIG. 8 may supply a gain of the same value to the multiplication units 66-1 to 66-4 at the timing when test data in which the pixels 00' to 03' have the same pixel value is generated and the pixels 00' to 03' are supplied to the multiplication unit 66.

Second Embodiment

<Configuration Example of Image Processing System>

Incidentally, as described with reference to FIG. 2, the image sensor 11 can add test data to image data, and output the image data to the outside.

This enables failure detection for a system in a later stage of the image sensor 11.

Figure 9:
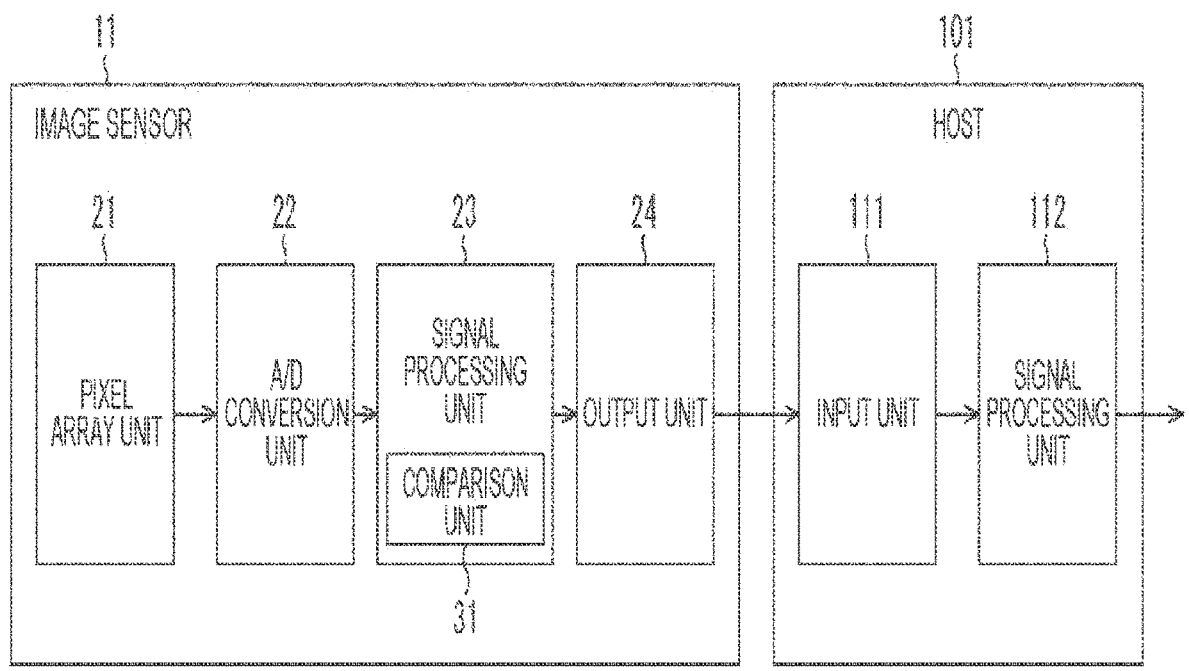
FIG. 9 illustrates a configuration example of an image processing system.

In such a case, an image processing system including the image sensor 11 and a host in the later stage of the image sensor 11 is configured as illustrated in FIG. 9, for example. Note that, in FIG. 9, the same signs are attached to the parts corresponding to those in FIG. 1, and the description thereof will be appropriately omitted.

The image processing system illustrated in FIG. 9 includes the image sensor 11 and a host 101 in the later stage of the image sensor 11.

The host 101 is a signal processing device that receives output data containing image data and test data output (transmitted) from the output unit 24 of the image sensor 11 and performs predetermined processing on the image data contained in the output data. The host 101 includes an input unit 111 and a signal processing unit 112.

The input unit 111 includes, for example, a receiver that complies with a predetermined standard such as MIPI, and extracts image data and test data of a captured image from output data output from the output unit 24.

Furthermore, the input unit 111 supplies the extracted image data and test data to the signal processing unit 112, and performs failure detection for, for example, the input unit 111, which has been defined as a diagnosis target, on the basis of the extracted test data. Note that, in a case where the signal processing unit 112 does not perform failure detection, only image data is required to be supplied to the signal processing unit 112.

The signal processing unit 112 performs predetermined processing, such as clamping processing, HDR combining processing, and gain adjustment processing, on the image data supplied from the input unit 111, and outputs the processing result to the outside.

Note that the input unit 111 and the signal processing unit 112 may have multi-phased configuration similarly to the signal processing unit 23. These input unit 111 and signal processing unit 112 include a digital circuit.

Figure 10:
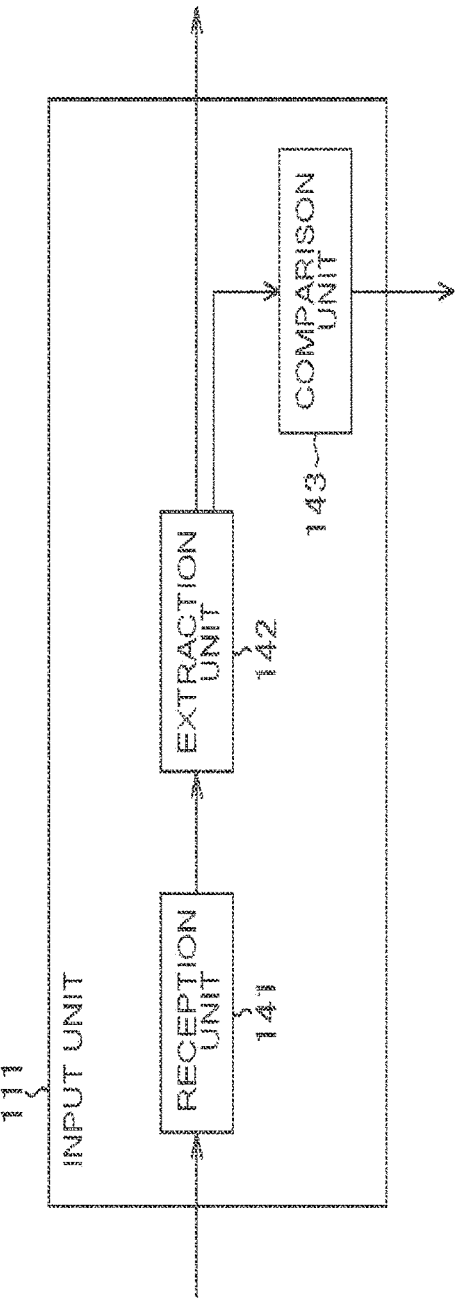
FIG. 10 illustrates a configuration example of an input unit.

Furthermore, the input unit 111 has configuration, for example, as illustrated in FIG. 10 in more detail.

The input unit 111 illustrated in FIG. 10 includes a reception unit 141, an extraction unit 142, and a comparison unit 143.

The reception unit 141 receives output data output from the output unit 24, and supplies the output data to the extraction unit 142. The extraction unit 142 extracts image data and test data from the output data supplied from the reception unit 141, supplies the image data and the test data to the signal processing unit 112, and supplies the test data to the comparison unit 143.

The comparison unit 143 corresponds to the comparison unit 31 of the image sensor 11, and performs failure detection on the basis of the test data supplied from the extraction unit 142.

For example, it is assumed that the signal processing unit 23 has the configuration illustrated in FIG. 5 and the test data illustrated in FIG. 4 is generated. At this time, for example, in a case where pixels 00' and 01' processed between the addition unit 62 and the extraction unit 142 are supplied from the extraction unit 142 as test data, the comparison unit 143 performs failure detection by comparing the pixel value of the pixel 00' to the pixel value of the pixel 01'.

Then, in a case where the pixel value of the pixel 00' and the pixel value of the pixel 01' match each other, the comparison unit 143 outputs a detection result indicating that no failure has occurred.

In contrast, in a case where the pixel value of the pixel 00' and the pixel value of the pixel 01' do not match each other, the comparison unit 143 outputs a detection result indicating that a failure has occurred.

In a case where the comparison unit 143 obtains the detection result indicating that a failure has occurred, a failure (trouble) has occurred between the addition unit 62 and the extraction unit 142. In this case, in a case where the comparison units for failure detection are provided in each of the signal processing unit 23 and the output unit 24, it can be specified at which block of the signal processing unit 23, the output unit 24, and the input unit 111 the failure has occurred.

Furthermore, since the comparison unit 143 is provided at the last stage of the input unit 111 in the configuration illustrated in FIG. 10, failure detection can be performed for a block in a range wider than the input unit 111.

Moreover, although an example in which the comparison unit 143 is provided in the input unit 111 has been described here, the comparison unit 143 may be provided not in the input unit 111 but in the signal processing unit 112. The comparison units for failure detection may be provided in both of the input unit 111 and the signal processing unit 112.

Furthermore, for example, a signal processing block for performing processing depending on a color component can be provided in the input unit 111 and the signal processing unit 112. In such a case, a selection unit for selecting processing in the signal processing block is required to be provided so that the same processing is performed on pixels of test data to be performed in parallel in different path, that is, a pair of pixels to be compared at the comparison unit.

<Description of Reception Processing>

The image processing system illustrated in FIG. 9 performs, for example, the data output processing described with reference to FIG. 6 on the side of the image sensor 11. Then, in a case where the data output processing is performed and output data is output from the output unit 24, the host 101 performs the reception processing illustrated in FIG. 11.

Figure 11:
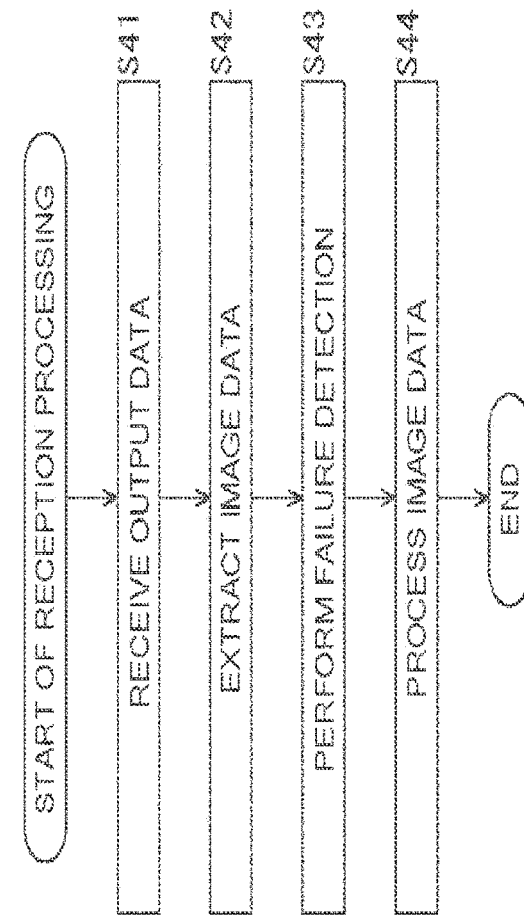
FIG. 11 is a flowchart illustrating reception processing.

The reception processing performed by the host 101 will be described below with reference to the flowchart of FIG. 11.

In Step S41, the reception unit 141 receives output data output from the output unit 24 of the image sensor 11, and supplies the output data to the extraction unit 142.

In Step S42, the extraction unit 142 extracts image data and test data from the output data supplied from the reception unit 141, supplies the image data and the test data to the signal processing unit 112, and supplies the test data to the comparison unit 143.

In Step S43, the comparison unit 143 performs failure detection on the basis of the test data supplied from the extraction unit 142, and outputs the detection result. In Step S43, processing similar to that in Step S17 in FIG. 6 is performed.

In Step S44, the signal processing unit 112 performs predetermined processing such as clamping processing on the image data supplied from the extraction unit 142, and outputs the processing result. Then, the reception processing ends.

As described above, the host 101 receives output data output from the image sensor 11, extracts test data, and performs failure detection. This enables easier and more accurate failure detection similarly in the image sensor 11.

Note that, even in a case where failure detection is performed on the side of the host 101, failure detection at runtime can be performed similarly in the case where the failure detection is performed by the image sensor 11. Furthermore, even in a case where a user optionally sets a parameter such as a gain in, for example, the signal processing unit 112, failure detection can be correctly performed.

<Example of Application to Vehicle>

Figure 12:
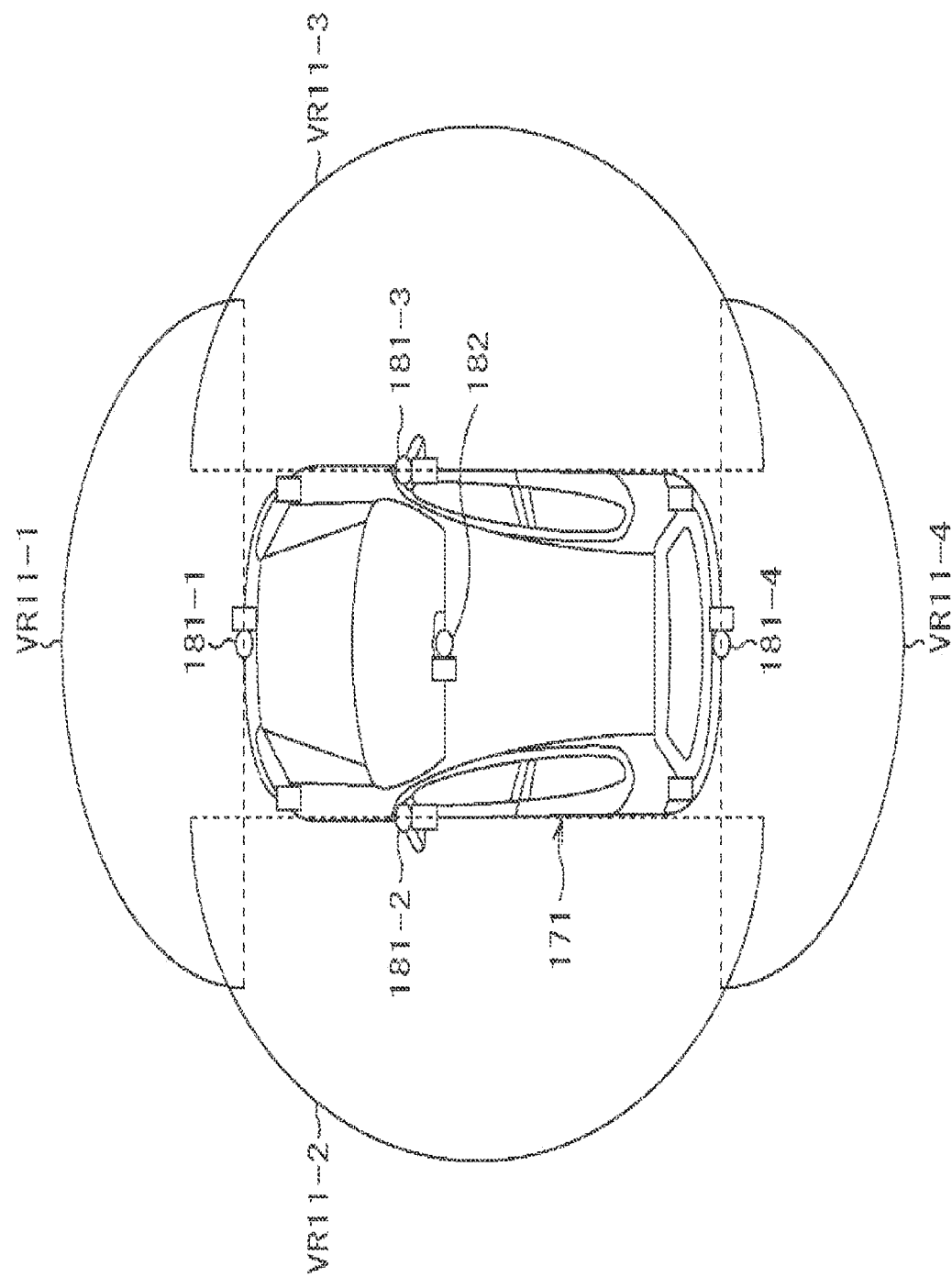
FIG. 12 illustrates an example of application of the image processing system to a vehicle.

Moreover, in a case where the above-described image sensor 11 or the image processing system including the image sensor 11 and the host 101 is applied to a vehicle, the vehicle is configured as illustrated in FIG. 12, for example.

A vehicle 171 illustrated in FIG. 12 is an automobile having a safety function. For example, the vehicle 171 includes cameras 181-1 to 181-4 for obtaining a captured image used for control related to driving of the vehicle 171.

Here, the camera 181-1 obtains a captured image while defining an area VR11-1 in front of the vehicle 171 as an object.

Furthermore, the camera 181-2 obtains a captured image while defining an area VR11-2 on the left side of the vehicle 171 as an object. The camera 181-3 obtains a captured image while defining an area VR11-3 on the right side of the vehicle 171 as an object.

Moreover, the camera 181-4 obtains a captured image while defining an area VR11-4 in back of the vehicle 171 as an object.

Note that, in a case where the cameras 181-1 to 181-4 do not need to be particularly distinguished, the cameras 181-1 to 181-4 are also hereinafter simply referred to as cameras 181.

These cameras 181 include, for example, an image sensor 11.

Furthermore, a captured image obtained by the camera 181 is supplied to, for example, a vehicle control unit 182 disposed at the center of the vehicle 171, and used for control related to driving of the vehicle 171.

The vehicle control unit 182 includes, for example, an advanced driving assistant system (ADAS) chip. The vehicle control unit 182 performs image analysis for the captured image supplied from the camera 181. The vehicle control unit 182 also performs control related to driving of the vehicle 171 such as a steering wheel, an accelerator, and a brake on the basis of a result of the image analysis. The above-described host 101 can be provided in, for example, the vehicle control unit 182.

<Configuration Example of Computer>

Incidentally, the above-described series of processing can be executed by hardware or software. In a case where the series of processing is executed by software, a program constituting the software is installed in a computer. The computer here includes, for example, a computer incorporated in dedicated hardware and, for example, a general-purpose personal computer capable of executing various functions by installing various programs.

Figure 13:
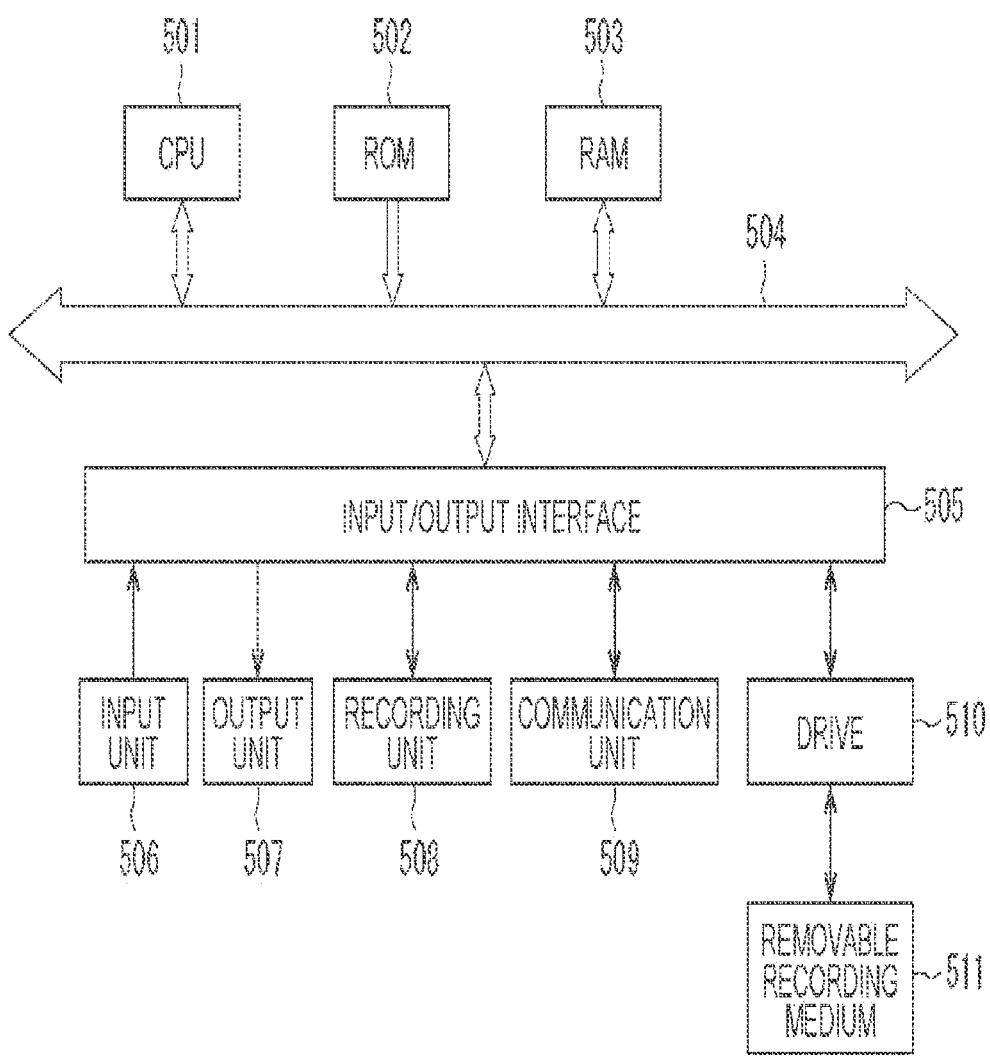
FIG. 13 illustrates a configuration example of a computer.

FIG. 13 is a block diagram illustrating a configuration example of hardware of a computer that executes the above-described series of processing by using a program.

In the computer, a central processing unit (CPU) 501, a read only memory (ROM) 502, and a random access memory (RAM) 503 are connected to each other by a bus 504.

An input/output interface 505 is also connected to the bus 504. An input unit 506, an output unit 507, a recording unit 508, a communication unit 509, and a drive 510 are connected to the input/output interface 505.

The input unit 506 includes, for example, a keyboard, a mouse, a microphone, and an imaging element. The output unit 507 includes, for example, a display, and a speaker. The recording unit 508 includes, for example, a hard disk and a nonvolatile memory. The communication unit 509 includes, for example, a network interface. The drive 510 drives a removable recording medium 511 such as a magnetic disk, an optical disk, a magneto-optical disk, and a semiconductor memory.

In the computer configured as described above, the above-described series of processing is performed by the CPU 501 loading, for example, a program recorded in the recording unit 508 in the RAM 503 via the input/output interface 505 and the bus 504 and executing the program.

A program to be executed by the computer (CPU 501) can be provided by, for example, being recorded in the removable recording medium 511 serving as a package medium and the like. Furthermore, the program can be provided via a wired or wireless transmission medium such as a local area network, the Internet, and digital satellite broadcasting.

In the computer, the program can be installed in the recording unit 508 via the input/output interface 505 by mounting the removable recording medium 511 in the drive 510. Furthermore, the program can be received by the communication unit 509 via a wired or wireless transmission medium, and installed in the recording unit 508. In addition, the program can be installed in the ROM 502 and the recording unit 508 in advance.

Note that a program executed by a computer may be chronologically processed along the order described in the specification, or may be processed in parallel or at necessary timing, for example, the timing when calling is performed.

Furthermore, embodiments of the present technology are not limited to the above-described embodiments, and various modifications are possible without departing from the spirit of the present technology.

For example, the present technology can have a configuration of cloud computing in which a plurality of apparatuses shares one function via a network and performs processing together.

Furthermore, in addition to being executed by one apparatus, each step described in the above-described flowchart can be shared and executed by a plurality of apparatuses.

Moreover, in a case where one step includes a plurality of pieces of processing, the plurality of pieces of processing included in that one step can be shared and executed by a plurality of apparatuses in addition to being executed by one apparatus. Moreover, the present technology can also have the following configurations.

(1)

A signal processing device including:

an addition unit that adds test data for failure detection to valid data on which predetermined processing is to be performed, two or more samples processed in parallel in different paths having a same sample value in the test data; and a signal processing unit that performs the predetermined processing on the valid data and the test data that has been added to the valid data by a plurality of the paths.

(2)

The signal processing device according to (1), further including a comparison unit that compares sample values of the two or more samples of the test data on which the predetermined processing has been performed by the signal processing unit.

(3)

The signal processing device according to (1) or (2), in which the signal processing unit includes a selection unit that selects processing to be performed on the two or more samples so that same processing is performed on the two or more samples as the predetermined processing.

(4)

The signal processing device according to (3), in which the valid data is image data of a color image, and the selection unit selects processing in accordance with a color component of a pixel as the predetermined processing for the pixel of the valid data, and selects same processing as the predetermined processing for the two or more samples of the test data.

(5)

The signal processing device according to any one of (1) to (4), further including a test data generation unit that generates the test data.

(6)

The signal processing device according to any one of (1) to (5), further including an output unit that outputs the valid data and the test data on which the predetermined processing has been performed.

(7)

The signal processing device according to any one of (1) to (6), in which the valid data is image data.

(8)

A signal processing method including the steps of:

adding test data for failure detection to valid data on which predetermined processing is to be performed, two or more samples processed in parallel in different paths having a same sample value in the test data; and performing the predetermined processing on the valid data and the test data that has been added to the valid data by a plurality of the paths.

(9)

A program causing a computer to execute processing including the steps of:

adding test data for failure detection to valid data on which predetermined processing is to be performed, two or more samples processed in parallel in different paths having a same sample value in the test data; and performing the predetermined processing on the valid data and the test data that has been added to the valid data by a plurality of the paths.

(10)

A signal processing device including:

a reception unit that receives output data including valid data and test data for failure detection, the test data being added to the valid data, two or more samples processed in parallel in different paths having a same sample value in the test data; and a comparison unit that compares sample values of the two or more samples of the test data.

(11)

The signal processing device according to (10), in which the reception unit receives the output data in which the valid data and the test data are each processed in parallel by a plurality of the paths in an outside signal processing block.

(12)

The signal processing device according to (10) or (11), further including a signal processing unit that performs predetermined processing on the valid data and the test data of the output data received by the reception unit, in which the comparison unit compares sample values of the two or more samples of the test data on which the predetermined processing has been performed by the signal processing unit.

(13)

The signal processing device according to any one of (10) to (12), in which the valid data is image data.

(14)

A signal processing method including the steps of:

receiving output data including valid data and test data for failure detection, the test data being added to the valid data, two or more samples processed in parallel in different paths having a same sample value in the test data; and comparing sample values of the two or more samples of the test data.

(15)

A program causing a computer to execute processing including the steps of:

receiving output data including valid data and test data for failure detection, the test data being added to the valid data, two or more samples processed in parallel in different paths having a same sample value in the test data; and comparing sample values of the two or more samples of the test data.

REFERENCE SIGNS LIST

11 Image sensor
21 Pixel array unit
22 A/D conversion unit
23 Signal processing unit
24 Output unit
31 Comparison unit
61 Pattern generator
62 Addition unit
65-1, 65-2, 65 Selector
66-1 to 66-4, and 66 Multiplication unit
101 Host
111 Input unit
112 Signal processing unit
141 Reception unit
142 Extraction unit
143 Comparison unit

The invention claimed is:

1. An imaging device, comprising:
circuitry configured to:
generate image data;
add digital test data to the image data, wherein the digital test data includes first digital test data and second digital test data;
perform specific processing on the first digital test data and the second digital test data; and
compare the processed first digital test data with the processed second digital test data.

2. The imaging device according to claim 1, wherein the circuitry is further configured to perform the specific processing on the image data.

3. The imaging device according to claim 1, wherein the circuitry is further configured to generate the digital test data.

4. The imaging device according to claim 1, wherein the specific processing comprises at least one of a gain adjustment processing, a clamp processing and a HDR processing.

5. The imaging device according to claim 1, wherein the circuitry is further configured to add the digital test data to a header of the image data or a footer of the image data.

6. The imaging device according to claim 1, wherein the circuitry is further configured to add the digital test data to the image data at every frame.

7. The imaging device according to claim 1, wherein the circuitry is further configured to select, as the specific processing, one of a plurality of kinds of processing to be performed on the first digital test data and the second digital test data.

8. The imaging device according to claim 1, wherein the imaging device is mounted on a vehicle.

9. A signal processing method, comprising:
in an imaging device:
generating image data;
adding digital test data to the image data, wherein the digital test data includes first digital test data and second digital test data;
performing specific processing on the first digital test data and the second digital test data; and
comparing the processed first digital test data with the processed second digital test data.

10. The signal processing method according to claim 9, further performing the specific processing on the image data.

11. The signal processing method according to claim 9, further generating the digital test data.

12. The signal processing method according to claim 9, wherein the specific processing comprises at least one of a gain adjustment processing, a clamp processing and a HDR processing.

13. The signal processing method according to claim 9, further adding the digital test data to a header of the image data or a footer of the image data.

14. The signal processing method according to claim 9, further adding the digital test data to the image data at every frame.

15. The signal processing method according to claim 9, further selecting, as the specific processing, one of a plurality of kinds of processing to be performed on the first digital test data and the second digital test data.

16. The signal processing method according to claim 9, wherein the imaging device is mounted on a vehicle.

17. A vehicle, comprising:
an imaging unit that includes an imaging device configured to generate image data;
an outside-vehicle information detecting unit configured to detect an object in an environment based on the image data;
a vehicle control unit configured to control a driving unit for a driver assistance system of the vehicle based on an information obtained by the outside-vehicle information detecting unit, wherein
the imaging device comprising:
circuitry configured to:
add digital test data to the image data, wherein the digital test data includes first digital test data and second digital test data;
perform specific processing on the first digital test data and the second digital test data; and
compare the processed first digital test data with the processed second digital test data, wherein the vehicle control unit is further configured to restrict a function of the driver assistance system based on a result of the comparison.

18. The vehicle according to claim 17, wherein the vehicle control unit is further configured to notify information to an occupant of the vehicle based on the result of the comparison.

19. The vehicle according to claim 17, wherein the driver assistance system comprises at least one of a collision avoidance system, a collision damage mitigation system, a cruise control system, a collision warning system, and a lane departure warning system.

20. The vehicle according to claim 17, further comprising a sensor, wherein the vehicle control unit is further configured to control an operation of the sensor based on the result of the comparison.

* * * * *